United States Patent
McKinzie et al.

(10) Patent No.: US 9,438,076 B2
(45) Date of Patent: Sep. 6, 2016

(54) STATOR LAMINATION STACK INDEXING AND RETENTION

(75) Inventors: Kyle K. McKinzie, Altamont, KS (US); Galen R. Love, Cherryvale, KS (US)

(73) Assignee: Deere & Company, Moline, IL (US)

( * ) Notice: Subject to any disclaimer, the term of this patent is extended or adjusted under 35 U.S.C. 154(b) by 367 days.

(21) Appl. No.: 13/466,273

(22) Filed: May 8, 2012

(65) Prior Publication Data

US 2013/0300250 A1    Nov. 14, 2013

(51) Int. Cl.
*H02K 1/06* (2006.01)
*H02K 1/28* (2006.01)
*H02K 1/18* (2006.01)

(52) U.S. Cl.
CPC .................................... *H02K 1/185* (2013.01)

(58) Field of Classification Search
CPC ............................... H02K 1/18; H02K 17/16
USPC ................... 310/216.058, 216.113, 216.118, 310/216.121, 216.133, 216.128, 216, 78, 310/216.82–85, 216.124, 216.132–133
See application file for complete search history.

(56) References Cited

U.S. PATENT DOCUMENTS

| | | | |
|---|---|---|---|
| 2,304,607 A * | 12/1942 | Sleeter | H02K 1/185 29/56.5 |
| 2,492,678 A * | 12/1949 | Amtsberg | 310/266 |
| 4,464,826 A | 8/1984 | Bair | |
| 5,684,348 A | 11/1997 | Main | |
| 6,346,760 B1 | 2/2002 | Boardman, IV | |
| 6,885,125 B2 * | 4/2005 | Inayama et al. | 310/216.043 |
| 2003/0184182 A1* | 10/2003 | Smith, Jr. | 310/217 |
| 2007/0069591 A1 | 3/2007 | LeFlem | |

FOREIGN PATENT DOCUMENTS

| | | | |
|---|---|---|---|
| CN | 101232211 | | 7/2008 |
| GB | 981727 | | 1/1965 |
| JP | 60020736 A | * | 2/1985 |
| JP | 07163085 A | * | 6/1995 |
| JP | 2008125333 A | * | 5/2008 |

* cited by examiner

*Primary Examiner* — Jose Gonzalez Quinones
(74) *Attorney, Agent, or Firm* — Lorenz & Kopf, LLP

(57) ABSTRACT

An electrical device including a housing having an inner surface, a lamination assembly and at least one pin extending from an inner surface of the housing. The lamination assembly has at least one slot therein. The lamination assembly is clocked to a position so that the at least one pin coacts with the at least one slot to rotationally orient the lamination assembly. The at least one pin additionally acts to constrain the lamination assembly from axial removal from the housing thereby rotationally and axially limiting movement of the lamination assembly to a predetermined range of movement within the housing.

20 Claims, 3 Drawing Sheets

STATOR LAMINATION STACK INDEXING AND RETENTION

FIELD OF THE INVENTION

The present invention relates to an electrical device such as a motor or generator, and, more particularly, to an apparatus and method of indexing and retaining stator laminations in the housing of an electrical device.

BACKGROUND OF THE INVENTION

Electrical devices such as generators and motors include a stator and a rotor. Typically a stator is stationary and a rotor rotates in an electrical device, although the opposite can also be the case. The stator may act as a field magnet interacting with the rotor to create motion in the rotor. Alternatively the stator may receive magnetic fields from the moving field coils of the rotor to thereby produce electrical power from the stator. Although a stator may be a permanent magnet, electromagnets are typically used having what is caused a field coil or field winding that is closely associated with a series of laminations to produce the electromagnet. The laminations are typically of a ferrous material such as silicone steel with the geometry and material type selected to reduce hysteresis and eddy current losses.

The laminations are typically identically stamped and are stacked in their arrangement with copper winding wire interfacing elements of the laminations to form the electromagnetic field coils of the stator assembly. Typically the stator is then dipped or coated in a varnish-like material to adhere the parts together and to reduce or prevent vibration between the laminations. The stator assembly is then inserted into a housing and secured thereto. The rotor then is inserted inside a central cavity of the stator along with bearings. If the rotor uses electromagnets, then slip rings are also coupled with the rotor to supply electrical conduction pathways to the coils contained in the rotor.

What is needed in the art is a cost effective way of aligning the stator to the housing as well as retaining it in at least a temporary fashion until being fully secured to the housing.

SUMMARY

The present invention provides for the clocking of a stator relative to a housing to thereby orient the stator rotationally and axially relative to the housing and retaining it thereto.

The invention in one form is directed to an electrical device including a housing having an inner surface, a lamination assembly and at least one pin extending from an inner surface of the housing. The lamination assembly has at least one slot therein. The lamination assembly is clocked to a position so that the at least one pin coacts with the at least one slot to rotationally orient the lamination assembly. The at least one pin additionally acts to constrain the lamination assembly from axial removal from the housing thereby rotationally and axially limiting movement of the lamination assembly to a predetermined range of movement within the housing.

The invention in another form is directed to an electrical device having a housing, a stator and at least one pin extending from the inner surface of the housing. The stator has at least one slot along an outer surface of the stator. The stator is clocked to a position so that the at least one pin coacts with the at last one slot to rotationally orient the stator as the stator is inserted into the housing. The at least one pin additionally acts to constrain the stator from axial movement to thereby rotationally and axially position the stator in a predetermined position in the housing.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
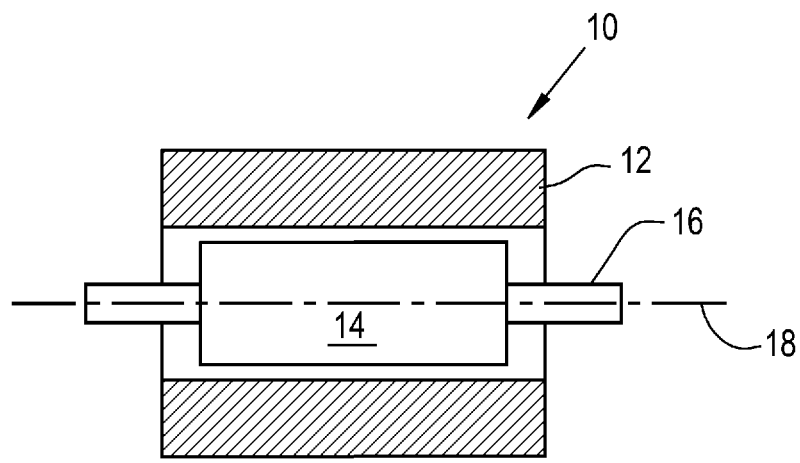
FIG. 1 is an abstract cross-sectional view of an electrical device made utilizing an embodiment of the present invention.

Referring now to the drawings, and more particularly to FIG. 1, there is shown an electrical device 10, which can also be an electrical motor or an electrical generator, having a stator 12, a rotor 14, and a shaft 16 that is oriented to rotate about axis 18. Stator 12 can also be understood to be a lamination assembly 12 as further described herein. For the sake of simplicity elements such as slip rings, electrical connections, bearings, windings and the housing of the motor are not illustrated in FIG. 1.

Figure 2:
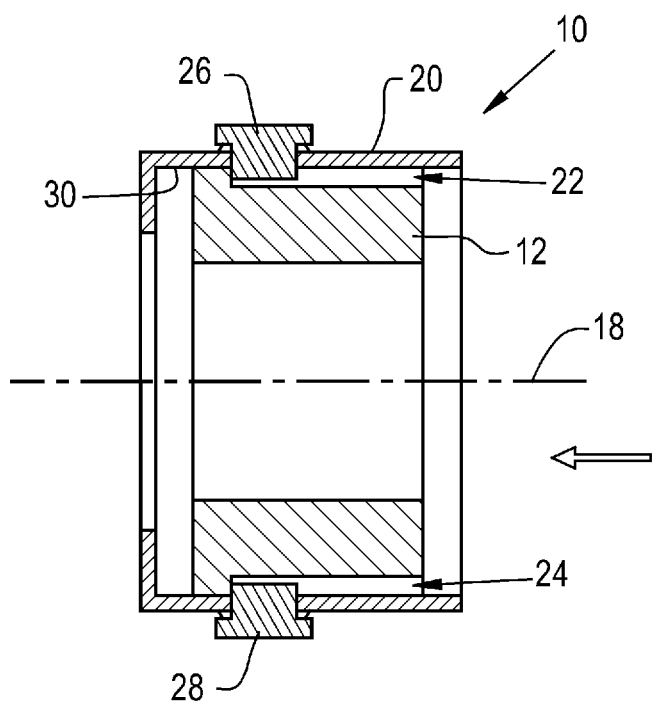
FIG. 2 is a cross-section view of the stator laminations used in the electrical device of the FIG. 1.

Now, additionally referring to FIG. 2 there is illustrated electrical device 10, with stator 12 inserted inside of a housing 20. Stator 12 has slots 22 and 24 that are shown interacting with pins 26 and 28. Pins 26 and 28 extend from an inner surface 30 of housing 20 and are shown engaging slots 22 and 24 respectively. Once lamination assembly 12 is inserted into the end of housing 20, pins 26 and 28 are inserted to allow lamination assembly 12 to be oriented or clocked into position so that slot 22 corresponds with pin 26 and slot 24 corresponds with pin 28. Although two slots 22 and 24 as well as two pins 26 and 28 are illustrated, other corresponding numbers of each or different numbers of each are also contemplated. Further, for the ease of illustration slots 22 and 24 are shown opposite each other, but other locations are also contemplated. Once lamination assembly 12 is inserted, the end of slots 22 and 24 prevent further axial movement of lamination assembly 12 once they encounter pins 26 and 28. As can be seen in FIG. 2 pins 26 and 28 do not extend inwardly to contact the bottom surfaces of slots 22 and 24 thereby allowing lamination assembly 12 to be retained in housing 20, so that lamination assembly 12 can be positioned and fastened in a conventional manner later in the assembly process. Pins 26 and 28 may be in the form of fasteners or other devices that are inserted through housing 20 to thereby engage slots 22 and 24 with the purpose of rotational alignment or the clocking of lamination assembly 12 and in order to restrain the axial movement beyond the desired position and to prevent the removal of lamination assembly 12 from housing 20. Pins 26 and 28 constrain the movement of lamination assembly 12 within housing 20 within a predetermined range of movement as determined by the size of pins 26 and 28 as well as the geometry of slots 22 and 24. Pins 26 and 28 may just hold lamination assembly 12 temporarily until other elements, not shown, are then further secured to housing 20.

Slots 22 and 24 may be machined into lamination assembly 12 after the laminations are stacked or otherwise positioned and slots 22 and 24 do not necessarily have a dead end or closed end as illustrated in FIG. 2 but may extend from one end of lamination assembly 12 to the other end of lamination assembly 12. Also, slots 22 and 24 may be closed on both ends. Further, although slots 22 and 24 are illustrated as being parallel with axis 18 other configurations and shapes are also contemplated such as a round bore of fixed depth.

Figure 3:
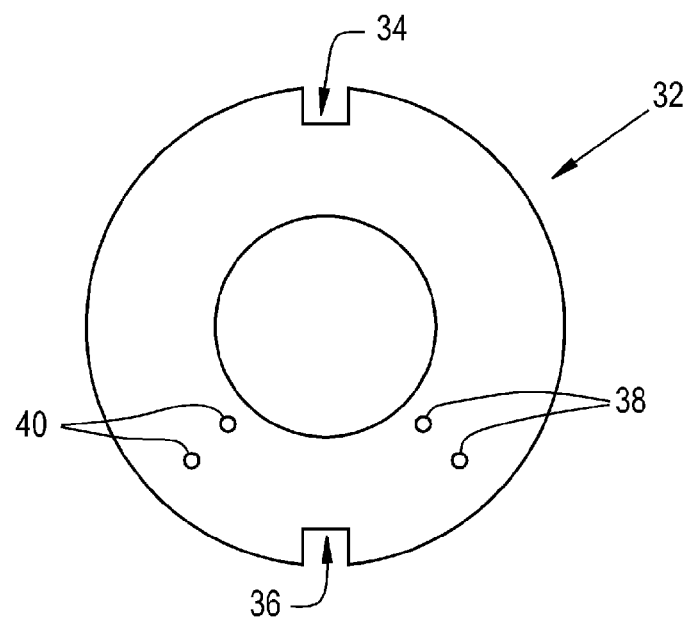
FIG. 3 is a plan view of a lamination utilized in the stator assembly of FIGS. 1 and 2.
Figure 4:
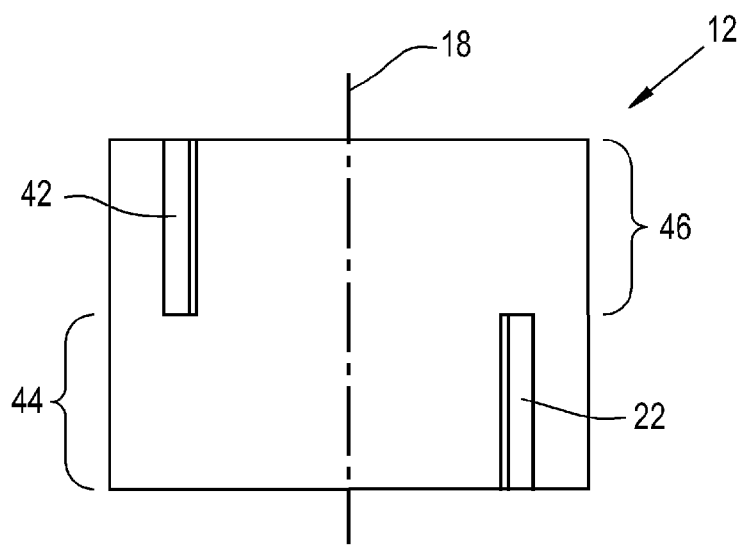
FIG. 4 is a side view of a stack of the laminations of FIG. 3 to thereby form the lamination assembly of the stator of FIGS. 1 and 2.
Figure 5:
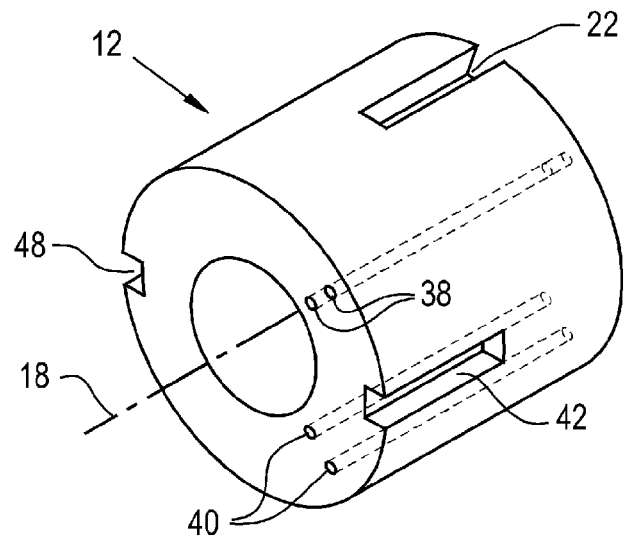
FIG. 5 is a perspective view of the lamination stack of FIG. 4.

Now, additionally referring to FIGS. 3-5, there is illustrated in FIG. 3 a singular lamination 32 having notches 34 and 36, and orientation features 38 and 40. Laminations 32 are chosen to have a desired thickness for the purposes of reducing hysteresis and eddy current losses in the assembly. Laminations 32 may be made in a stamping process having notches 34 and 36 that then will be subsequently aligned so as to form slots 22 and 24 respectively. Orientation features 38 and 40 are shown as examples of features which exist around the surface of lamination 32. Orientation features 38 and 40 include wiring paths that are oriented so that multiple aligning positions of features 38 and 40 may occur around the surface of lamination 32 such that features 38 and 40 may align while notches 34 and 36 may misalign so that features 38 and 40 can be utilized, for example, for the routing of copper wiring while certain portions of notches 34 and 36 may or may not be aligned. This feature is illustrated in FIG. 4, as a stack of laminations 32 that have a first portion 44 of the stack of laminations and a second portion 46 of the stack of laminations. Portion 44 and portion 46 are offset, say for example by ninety degrees, to thereby form slot 42 in a different angular and axial position from slot 22. This is accomplished by a rotation of portion 46, for example, of ninety degrees from portion 44 so that notches 34 and 36 do not align between portions 44 and 46. As seen in FIG. 5 orientation features 38 and 40 align throughout the length of lamination assembly 12 while slots 22, 42 and 48 are formed by the positioning of notches 34 and 36. The hidden lines illustrate that orientation features 38 and 40 are aligned and extend through the entire lamination assembly 12.

Figure 6:
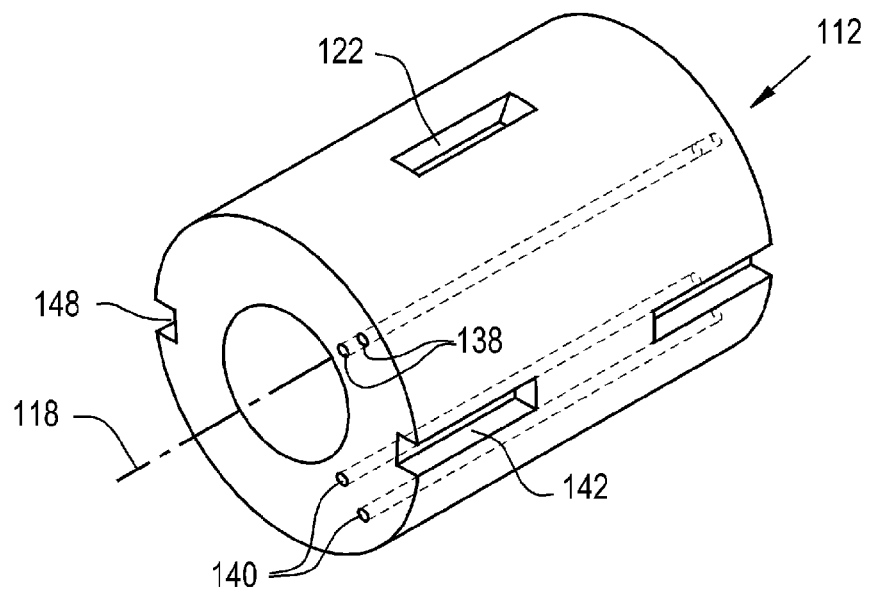
FIG. 6 is another perspective view of another embodiment of a stack of laminations of FIG. 3.

In another embodiment of the present invention illustrated in FIG. 6, slot 122 can be formed having two dead ends with portions of laminations 32 oriented in one direction and in a second direction and then back to a first direction so that slot 142 is interrupted by the offset and allowing the formation of slot 122. The elements of FIG. 6 are conveniently numbered one hundred higher than similar features illustrated in FIGS. 1-5 and have the same characteristics as those discussed by their lower number counterparts.

Pin 26 and/or pin 28 are used to precisely control the clocking of lamination assembly 12 so that the size of pins 26 and 28 may correspond to the width of slots 22 and 24. The looser control of the axial position is available during the assembly and disassembly processes to hold stator 12 proximate to its proper place to prevent stator 12 from backing out of housing 20 during the handling and assembly/disassembly of electrical device 10.

As shown in FIG. 2, stator lamination stack 12 is inserted into housing 20 also known as a frame. Fixturing can be used to ensure that slots 22 and 24 will line up respectively with radial pins 26 and 28 during the insertion process. When the stack of laminations illustrated as lamination assembly 12 are inserted to the predetermined depth or location, radial pins 26 and 28 can be inserted or inserted further. Pins 26 and 28 engage axial slots 22 and 24 respectively which are formed as notches in lamination 32 or machined to a predetermined depth in the outer surface of the lamination stack. Slots 22 and 24 as illustrated herein only covering a portion of the total lamination stack of lamination assembly 12. Radial pins 26 and 28 may contain a feature to lock them in to place to prevent them from disengaging from slots 22 and 24. Once pins 26 and 28 are inserted, lamination assembly 12 is prevented from turning about axis 18 within housing 20 and also from excess axial movement within electrical device 10.

Advantageously the present invention adds the combination of a slot on the stator and extending pins so that the stator can be properly oriented within housing 20 during assembly of electrical device 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An electrical device, comprising:
   a housing having an inner surface;
   a lamination assembly having at least one slot therein; and
   at least one pin having a width smaller than a length of a corresponding one of said at least one slot, said pin extending from said inner surface of said housing into said at least one slot to be spaced from a surface of said at least one slot such that a gap is formed between said at least one slot end and an axial side surface of said at least one pin, said lamination assembly being clocked to a position so that said at least one pin coacts with said at least one slot to rotationally orient said lamination assembly;
   wherein, prior to fastening said lamination assembly to said housing, said at least one pin limits a range of movement of said lamination assembly within said housing rotationally and axially, including preventing axial removal of said lamination assembly from said housing.

2. The electrical device of claim 1, wherein said at least one slot is substantially linear in an axial direction along an outer surface of said lamination assembly.

3. The electrical device of claim 2, wherein said at least one slot does not extend along an entire axial length of said lamination assembly.

4. The electrical device of claim 3, wherein said lamination assembly includes a plurality of laminations positioned into a stack, at least some of said plurality of laminations being substantially identical to each other.

5. The electrical device of claim 4, wherein said at least one slot is formed in said lamination assembly after said plurality of laminations are positioned into said stack.

6. The electrical device of claim 4, wherein at least some of said plurality of laminations have at least one notch, said at least one notch of each of said at least some of said plurality of laminations being aligned in said stack to form said at least one slot.

7. The electrical device of claim 6, wherein substantially all of said plurality of laminations have said at least one notch, said at least one slot being formed by a first portion of said plurality of laminations being aligned so said at least one notch of each said first portion of said plurality of laminations form said at least one slot, a second portion of said plurality of laminations being rotationally oriented so that said at least one notch does not align with said at least one slot thereby causing an end to said at least one slot.

8. The electrical device of claim 7, wherein said plurality of laminations additionally have a plurality of orientation features other than said at least one notch, said orientation features of said first portion being aligned with said orientation features of said second portion.

9. The electrical device of claim 1, wherein said lamination assembly is constrained in said axial direction relative to said housing by way of said at least one pin encountering an end to said slot in said axial direction.

10. The electrical device of claim 1, wherein the electrical device is one of an electric generator and an electric motor, said lamination assembly being a stator.

11. An electrical device, comprising:
a housing having an inner surface;
a stator having at least one slot along an outer surface of said stator; and
at least one pin having a width smaller than a length of a corresponding one of said at least one slot, said pin extending from said inner surface of said housing into said at least one slot to be spaced from a surface of said at least one slot such that a gap is formed between said at least one slot and said end and an axial side surface of said at least one pin, said stator being clocked to a position so that said at least one pin coacts with said at least one slot to rotationally orient said stator;
wherein, prior to fastening said stator to said housing, said at least one pin limits a range of movement of said stator within said housing rotationally and axially, including preventing axial removal of said stator from said housing.

12. The electrical device of claim 11, wherein said at least one slot is substantially linear in an axial direction along an outer surface of said stator.

13. The electrical device of claim 12, wherein said at least one slot does not extend along an entire axial length of said stator.

14. The electrical device of claim 13, wherein said stator includes a plurality of laminations positioned into a stack, at least some of said plurality of laminations being substantially identical to each other.

15. The electrical device of claim 14, wherein said at least one slot is formed in said stator after said plurality of laminations are positioned into said stack.

16. The electrical device of claim 14, wherein at least some of said plurality of laminations have at least one notch, said at least one notch of each of said at least some of said plurality of laminations being aligned in said stack to form said at least one slot.

17. The electrical device of claim 16, wherein substantially all of said plurality of laminations have said at least one notch, said at least one slot being formed by a first portion of said plurality of laminations being aligned so said at least one notch of each said first portion of said plurality of laminations form said at least one slot, a second portion of said plurality of laminations being rotationally oriented so that said at least one notch does not align with said at least one slot thereby causing an end to said at least one slot.

18. The electrical device of claim 17, wherein said plurality of laminations additionally have a plurality of orientation features other than said at least one notch, said orientation features of said first portion being aligned with said orientation features of said second portion.

19. The electrical device of claim 11, wherein said stator is constrained in said axial direction relative to said housing by way of said at least one pin encountering an end to said slot in said axial direction.

20. The electrical device of claim 11, wherein the electrical device is one of an electric generator and an electric motor.

* * * * *